(12) United States Patent
Nakai et al.

(10) Patent No.: US 11,898,991 B2
(45) Date of Patent: Feb. 13, 2024

(54) INSPECTION DEVICE AND INSPECTION METHOD

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Yutaka Nakai, Yokohama Kanagawa (JP); Tomio Ono, Yokohama Kanagawa (JP); Noriko Yamamoto, Yokohama Kanagawa (JP); Kazuhiro Itsumi, Tokyo (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 274 days.

(21) Appl. No.: 17/410,522

(22) Filed: Aug. 24, 2021

(65) Prior Publication Data

US 2022/0291173 A1   Sep. 15, 2022

(30) Foreign Application Priority Data

Mar. 10, 2021 (JP) ................. 2021-038345

(51) Int. Cl.
*G01N 29/04* (2006.01)
*G01N 29/34* (2006.01)
*G01N 29/44* (2006.01)

(52) U.S. Cl.
CPC ......... *G01N 29/041* (2013.01); *G01N 29/343* (2013.01); *G01N 29/44* (2013.01); *G01N 2291/011* (2013.01); *G01N 2291/015* (2013.01)

(58) Field of Classification Search
CPC .... G01N 29/041; G01N 29/343; G01N 29/44; G01N 29/2462; G01N 29/27;
(Continued)

(56) References Cited

U.S. PATENT DOCUMENTS 5,044,769 A * 9/1991 Kulczyk ................ G01K 11/24
374/208
2004/0150155 A1  8/2004 Okitsu et al.
(Continued)

FOREIGN PATENT DOCUMENTS

JP  2000-025988 A  1/2000
JP  3860126 B2  12/2006
(Continued)

*Primary Examiner* — Suman K Nath
(74) *Attorney, Agent, or Firm* — Foley & Lardner LLP

(57) ABSTRACT

According to one embodiment, an inspection device includes a transmitter configured to transmit a first ultrasonic wave, a receiver on which the first ultrasonic wave is incident, and a receiving-side waveguide located between the receiver and an inspection position. The receiver is configured to output a signal corresponding to the incident first ultrasonic wave. The inspection position is between the transmitter and the receiver. The first ultrasonic wave passes through the receiving-side waveguide. An inspection object passes through the inspection position along a second direction crossing a first direction. The first direction is from the transmitter toward the receiver. The receiving-side waveguide includes at least one of a first structure or a second structure. In the first structure, the receiving-side waveguide includes a tubular member and an inner member. The inner member is located inside the tubular member. In the second structure, the receiving-side waveguide includes a tubular member.

8 Claims, 11 Drawing Sheets

(58) Field of Classification Search
CPC ....... G01N 2291/011; G01N 2291/015; G01N 2291/0237; G01N 2291/045; G01N 2291/102; G01N 2291/2638; G01N 2291/048; G01N 2291/2636
See application file for complete search history.

(56) References Cited

U.S. PATENT DOCUMENTS

| | | |
|---|---|---|
| 2009/0207323 A1 | 8/2009 | Tamura |
| 2012/0061901 A1 | 3/2012 | Yamamoto et al. |
| 2019/0324134 A1* | 10/2019 | Cattle .................... G01S 7/032 |
| 2021/0123796 A1 | 4/2021 | Itsumi et al. |
| 2022/0065820 A1 | 3/2022 | Nakai et al. |

FOREIGN PATENT DOCUMENTS

| | | |
|---|---|---|
| JP | 2012-063276 A | 3/2012 |
| JP | 2021-067543 A | 4/2021 |
| JP | 2022-042612 A | 3/2022 |

* cited by examiner ated patent.

INSPECTION DEVICE AND INSPECTION METHOD

CROSS-REFERENCE TO RELATED APPLICATIONS

This application is based upon and claims the benefit of priority from Japanese Patent Application No. 2021-038345, filed on Mar. 10, 2021; the entire contents of which are incorporated herein by reference.

FIELD

Embodiments described herein relate generally to an inspection device and an inspection method.

BACKGROUND

For example, there is an inspection device that uses an ultrasonic wave or the like. It is desirable to increase the detection sensitivity.

DETAILED DESCRIPTION

Figure 1:
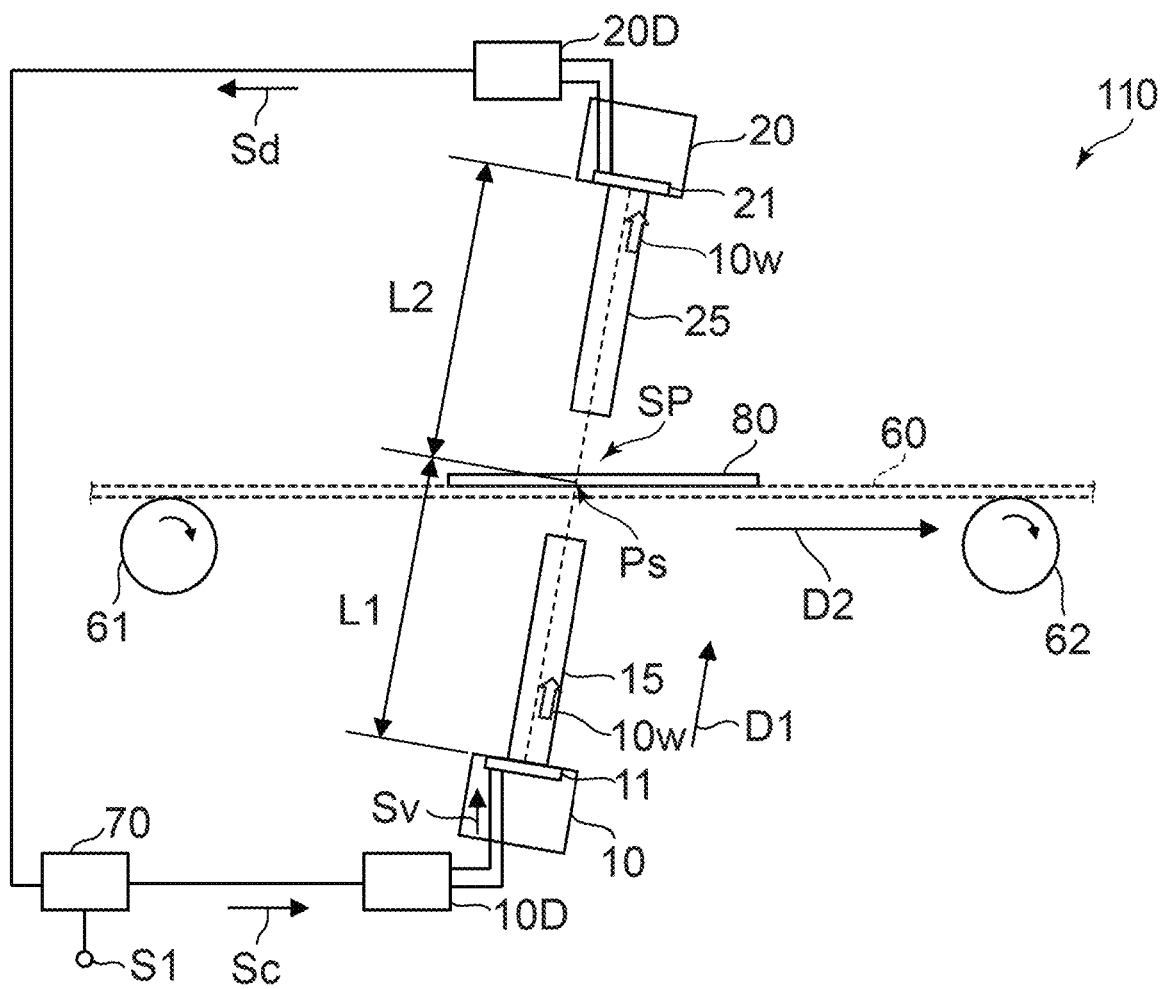
FIG. 1 is a schematic side view illustrating an inspection device according to a first embodiment.

According to one embodiment, an inspection device includes a transmitter configured to transmit a first ultrasonic wave, a receiver on which the first ultrasonic wave is incident, and a receiving-side waveguide located between the receiver and an inspection position. The receiver is configured to output a signal corresponding to the incident first ultrasonic wave. The inspection position is between the transmitter and the receiver. The first ultrasonic wave passes through the receiving-side waveguide. An inspection object passes through the inspection position along a second direction crossing a first direction. The first direction is from the transmitter toward the receiver. The receiving-side waveguide includes at least one of a first structure or a second structure. In the first structure, the receiving-side waveguide includes a tubular member and an inner member, the inner member is located inside the tubular member, and at least a portion of the inner member includes at least one of a mesh structure, a porous structure, or a surface unevenness structure. In the second structure, the receiving-side waveguide includes a tubular member, and at least a portion of the tubular member includes at least one of a mesh structure, a porous structure, or a surface unevenness structure.

According to one embodiment, an inspection device includes a transmitter configured to transmit a first ultrasonic wave, and a receiver on which the first ultrasonic wave is incident. The first ultrasonic wave includes a plurality of burst waves having a first period Tp. The receiver is configured to output a signal corresponding to the incident first ultrasonic wave. The first period Tp (s), a receiving-side distance L2 (m), and a velocity vx (m/s) satisfy Tp<2×L2/vx. The receiving-side distance is a distance along a first direction between the receiver and an inspection position. The first direction is from the transmitter toward the receiver. An inspection object passes through the inspection position along a second direction crossing the first direction. The velocity vx is a propagation velocity of the first ultrasonic wave in a space between the transmitter and the receiver. A receiving-side transmittance for the first ultrasonic wave between the inspection position and the receiver is less than 0.55.

According to one embodiment, an inspection method is disclosed. The method can include transmitting, from a transmitter toward an inspection object, a first ultrasonic wave including a plurality of burst waves having a first period Tp. The method can include inspecting the inspection object by using a receiver to receive the first ultrasonic wave after the first ultrasonic wave passes through the inspection object. The first period Tp (s), a receiving-side distance L2 (m), and a velocity vx (m/s) satisfy Tp<2×L2/vx. The receiving-side distance is a distance along a first direction between the inspection position and the receiver. The first direction is from the transmitter toward the receiver. The inspection object passes through the inspection position along a second direction crossing the first direction. The velocity vx is a propagation velocity of the first ultrasonic wave in a space between the transmitter and the receiver. A receiving-side transmittance for the first ultrasonic wave between the inspection position and the receiver is less than 0.55.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

Exemplary embodiments will now be described with reference to the drawings.

The drawings are schematic or conceptual; and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in reference to a drawing therein above are marked with like reference numerals, and a detailed description is omitted as appropriate.

First Embodiment

FIG. 1 is a schematic side view illustrating an inspection device according to a first embodiment.

As shown in FIG. 1, the inspection device 110 according to the embodiment includes a transmitter 10 and a receiver 20.

The transmitter 10 is configured to transmit a first ultrasonic wave 10w. The first ultrasonic wave 10w includes, for example, multiple burst waves having a first period Tp. For example, the first period Tp corresponds to the time between the start of one of the multiple burst waves and the start of the next one of the multiple burst waves. Examples of the first ultrasonic wave 10w are described below.

The first ultrasonic wave 10w is incident on the receiver 20. In addition to a direct wave of the first ultrasonic wave 10w that is emitted from the transmitter 10, the first ultrasonic wave 10w that is incident on the receiver 20 may include reflected waves of the first ultrasonic wave 10w reflected by various members. The receiver 20 is configured to output a signal Sd that corresponds to the first ultrasonic wave 10w incident on the receiver 20.

An inspection object 80 passes between the transmitter 10 and the receiver 20. The inspection object 80 passes through an inspection position Ps between the transmitter 10 and the receiver 20.

The inspection object 80 is, for example, a banknote, etc. The inspection object 80 may be a document such as a security, etc. The material of the inspection object 80 is arbitrary.

The direction from the transmitter 10 toward the receiver 20 is taken as a first direction D1. The inspection object 80 passes through the inspection position Ps along a second direction D2 that crosses the first direction D1. The second direction D2 may be oblique to the first direction D1. The inspection position Ps is a portion of a space SP between the transmitter 10 and the receiver 20.

For example, a supporter 60 is included. The supporter 60 is configured to support the inspection object 80 and to cause the inspection object 80 to pass through the inspection position Ps.

In the example, the supporter 60 is fed by a first feeder 61 (e.g., a roller) and a second feeder 62 (e.g., a roller). The inspection object 80 is fed along the second direction D2 according to the feed of the supporter 60. The second direction D2 is, for example, the feed direction.

For example, the supporter 60 supports the inspection object 80 at a position at which the first ultrasonic wave 10w is not irradiated on the supporter 60. For example, the supporter 60 is not located at the inspection position Ps. For example, the supporter 60 may support an end portion of the inspection object 80, etc. Because the first ultrasonic wave 10w is not irradiated on the supporter 60, the inspection object 80 can be appropriately inspected.

For example, the transmitter 10 includes a deformable transmitting-side membrane portion 11. The transmitting-side membrane portion 11 emits the first ultrasonic wave 10w. A transmitting circuit 10D is connected to the transmitter 10. The transmitting-side membrane portion 11 is caused to deform by a drive signal Sv from the transmitting circuit 10D; and the first ultrasonic wave 10w is emitted. For example, the deformation of the transmitting-side membrane portion 11 is generated by a piezoelectric element, etc.

For example, the receiver 20 includes a deformable receiving-side membrane portion 21. The receiving-side membrane portion 21 is deformed by the first ultrasonic wave 10w that is received. The signal Sd is obtained according to the deformation of the receiving-side membrane portion 21. For example, the deformation of the receiving-side membrane portion 21 is converted into an electrical signal by a piezoelectric element, etc.

For example, a controller 70 may be included. For example, the controller 70 supplies a control signal Sc to the transmitting circuit 10D. The transmitting circuit 10D causes the transmitting-side membrane portion 11 to deform according to the control signal Sc. Thereby, the first ultrasonic wave 10w is emitted from the transmitter 10. For example, the first ultrasonic wave 10w that is emitted from the transmitter 10 passes through the inspection object 80 and is incident on the receiver 20. The first ultrasonic wave 10w that is incident on the receiver 20 changes according to the state of the inspection object 80. The first ultrasonic wave 10w that is changed is received by the receiver 20. The signal Sd that is output from the receiver 20 reflects the state of the inspection object 80. For example, the signal Sd is supplied to the controller 70. The controller 70 is configured to process the signal Sd and output an inspection signal 51. The inspection signal 51 includes information relating to the inspection result of the inspection object 80.

The inspection device 110 may include the transmitting circuit 10D and a receiving circuit 20D. The inspection device 110 may include the controller 70. The controller 70 may include an electrical circuit (e.g., a computer, etc.) such as a CPU (Central Processing Unit), etc.

The first ultrasonic wave 10w that is emitted from the transmitter 10 is controlled by the drive signal Sv from the transmitting circuit 10D. For example, the first period Tp of the first ultrasonic wave 10w can be controlled by the drive signal Sv. For example, the duration of one of the multiple burst waves can be controlled by the drive signal Sv. The drive signal Sv from the transmitting circuit 10D may be controlled by the control signal Sc from the controller 70. In such a case, for example, the first period Tp of the first ultrasonic wave 10w may be controlled by the controller 70. For example, the duration of one of the multiple burst waves may be controlled by the controller 70.

According to the embodiment, the first ultrasonic wave 10w is appropriately controlled. The detection sensitivity can be increased thereby.

In the example, the inspection device 110 includes a receiving-side waveguide 25. The inspection device 110 may further include a transmitting-side waveguide 15.

The transmitting-side waveguide 15 is located between the transmitter 10 and the inspection position Ps. The first ultrasonic wave 10w passes through the transmitting-side waveguide 15. For example, the transmitting-side waveguide 15 guides the first ultrasonic wave 10w.

The receiving-side waveguide 25 is located between the inspection position Ps and the receiver 20. The receiving-side waveguide 25 passes through the first ultrasonic wave 10w. For example, the receiving-side waveguide 25 guides the first ultrasonic wave 10w. The first ultrasonic wave 10w that passes through the receiving-side waveguide 25 is incident on the receiver 20.

For example, the transmitting-side waveguide 15 is separated from the inspection position Ps. The receiving-side waveguide 25 is separated from the inspection position Ps. The inspection object 80 can move between the transmitting-side waveguide 15 and the receiving-side waveguide 25.

By providing these waveguides, the spreading of the first ultrasonic wave 10w can be suppressed. The detection sensitivity can be further increased.

According to the embodiment, the receiving-side waveguide 25 includes at least one of a first structure or a second structure. Examples of the first structure will now be described.

Figure 2A:
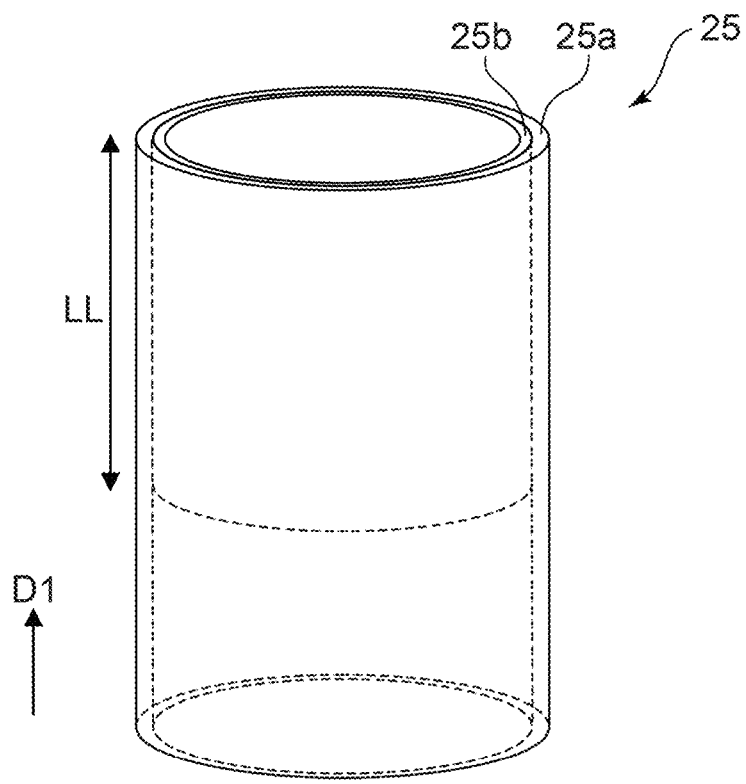
FIGS. 2A and 2B are schematic views illustrating a portion of the inspection device according to the first embodiment.
Figure 2B:
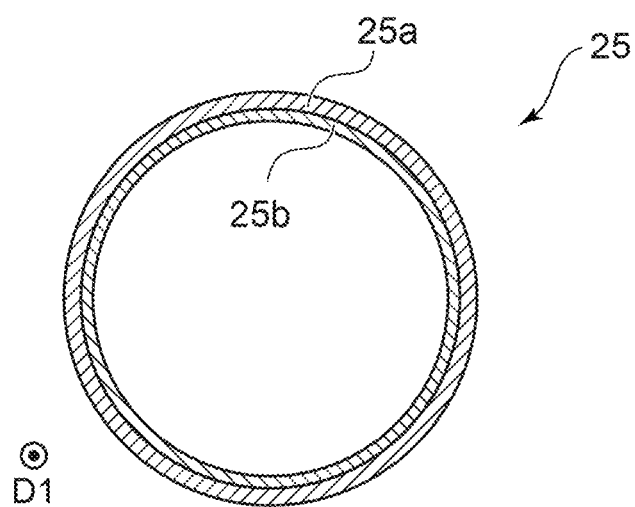

FIGS. 2A and 2B are schematic views illustrating a portion of the inspection device according to the first embodiment.

These drawings illustrate the receiving-side waveguide 25. FIG. 2A is a perspective view. FIG. 2B is a cross-sectional view.

In the first structure as shown in FIGS. 2A and 2B, the receiving-side waveguide 25 includes a tubular member 25a and an inner member 25b. For example, the tubular member 25a extends along the first direction D1.

The inner member 25b is located inside the tubular member 25a. Multiple inner members 25b may be provided in the tubular member 25a. In one example, the multiple inner members 25b may be arranged along the circumferential direction of the tubular member 25a. The multiple inner members 25b may be arranged along the first direction D1. The tubular member 25a is located around the inner member 25b.

At least a portion of the inner member 25b includes at least one of a mesh structure, a porous structure, or a surface unevenness structure.

The inner member 25b that has the mesh structure includes, for example, multiple holes. At least one of the multiple holes extends through the inner member 25b along the thickness direction of the inner member 25b. For example, the mesh-shaped inner member 25b may have a woven mesh configuration. The cross-sectional shapes of the multiple holes may be polygonal or circular. Polygonal includes, for example, triangular, rectangular, hexagonal, etc.

The inner member 25b that has the porous structure includes, for example, multiple pores. The positions of the multiple pores may be different from each other along the thickness of the inner member 25b. At least a portion of the multiple pores may not extend through the inner member 25b along the thickness direction of the inner member 25b. The shapes of the multiple pores are arbitrary.

The inner member 25b that has the surface unevenness structure includes an unevenness in the surface of the inner member 25b. The shape of the unevenness is arbitrary.

The inner member 25b may include at least one of a metal or a resin. The tubular member 25a may include at least one of a metal or a resin. The materials of these members are arbitrary. The first ultrasonic wave 10w that passes through the receiving-side waveguide 25 is attenuated by providing the inner member 25b. By attenuating the first ultrasonic wave 10w in the receiving-side waveguide 25, the inspection object 80 is easily inspected at a high speed and with high accuracy as described below.

For example, when the inspection object 80 is inspected at high speed by the first ultrasonic wave 10w including multiple burst waves, the period (the first period Tp) of the multiple burst waves becomes short. In such a case, the inspection easily becomes difficult due to the effects of reflected waves.

For example, the first ultrasonic wave 10w that passes through the inspection object 80 passes through the receiving-side waveguide 25 and is incident on the receiver 20. The first ultrasonic wave 10w that is reflected by the receiver 20 is reflected by the inspection object 80. The first ultrasonic wave 10w that is reflected by the inspection object 80 passes through the receiving-side waveguide 25 and again is incident on the receiver 20. When the first period Tp is short, a state occurs in which the reflected wave that is again incident on the receiver 20 is superimposed with the next one of the multiple direct waves. An appropriate inspection is difficult due to the superimposition of the reflected wave and the direct wave.

It was found that according to the embodiment, the inspection is easier when the receiving-side waveguide 25 includes an inner member 25b such as that described above. It is considered that this is because the transmittance of the receiving-side waveguide 25 can be reduced by an inner member 25b such as that described above.

An example of results of an experiment performed by the inventor will now be described.

In the experiment, the first structure described above is employed. In the experiment, the receiving-side waveguide 25 includes the tubular member 25a and the inner member 25b. In the experiment, the inner member 25b has a mesh configuration.

In the experiment, the tubular member 25a is an aluminum tube. The tubular member 25a has a circular tubular shape. The inner diameter of the tubular member 25a is 4 mm. The length (the length along the first direction D1) of the tubular member 25a is 50 mm. The inner member 25b is a mesh-shaped resin. The thickness of the mesh-shaped resin is 120 μm. The mesh pitch of the mesh-shaped resin is 140 μm.

In the experiment, a length LL along the first direction D1 of the inner member 25b (referring to FIG. 2A) is modified. Or, the tubular member 25a is provided, and the inner member 25b is not provided. Such a case corresponds to when the length LL is 0.

In the experiment, the first period Tp of the multiple burst waves is 250 μs. The resonant frequencies of the transmitter 10 and the receiver 20 are 90 kHz. The inspection object 80 is paper. The distance between the transmitting-side waveguide 15 and the receiving-side waveguide 25 is 6 mm.

FIGS. 3A to 3D are schematic views illustrating experiment results relating to the inspection device.

In these figures, the horizontal axis is a time tm. In these figures, the vertical axis is an intensity Int of a signal detected by the receiver 20.

Figure 3A:
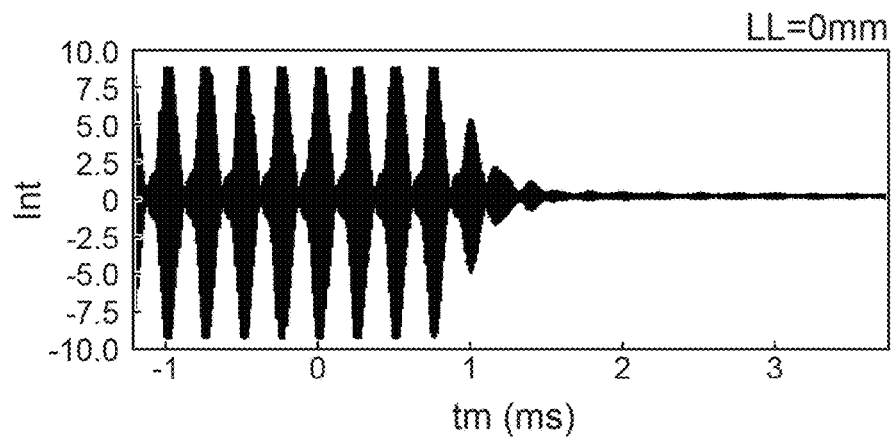
FIGS. 3A to 3D are schematic views illustrating experiment results relating to the inspection device.
Figure 3B:
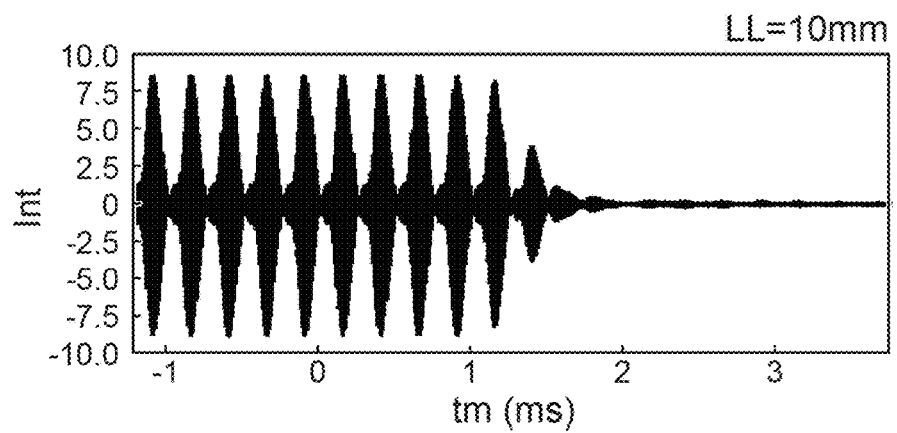
Figure 3C:
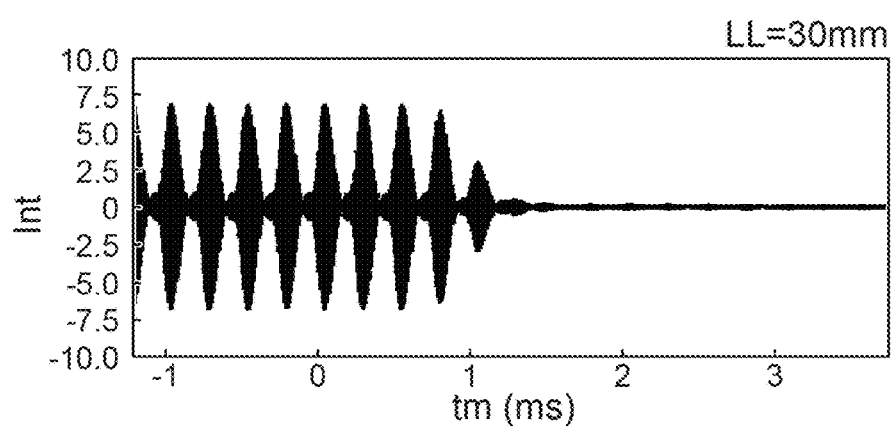
Figure 3D:
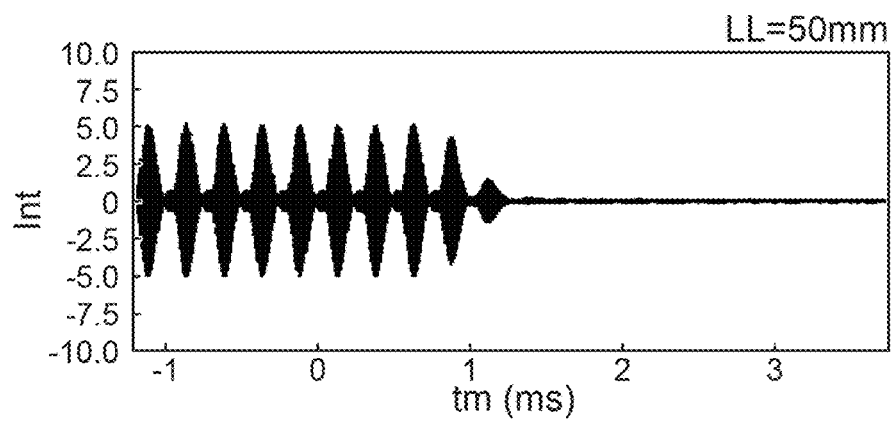

FIG. 3A corresponds to when the mesh-shaped inner member 25b is not provided (LL=0). FIG. 3B corresponds to when the length LL of the mesh-shaped inner member 25b is 10 mm. FIG. 3C corresponds to when the length LL of the mesh-shaped inner member 25b is 30 mm. FIG. 3D corresponds to when the length LL of the mesh-shaped inner member 25b is 50 mm.

In these figures, the period in which the intensity Int of the signal is large and has a constant change corresponds to the period before the inspection object 80 (the paper) reaches the inspection position Ps. The intensity Int of the signal decreases as the inspection object 80 starts to pass through the inspection position Ps. Subsequently, the intensity Int of the signal becomes substantially micro as the inspection object 80 continues to pass through the inspection position Ps. The period in which the intensity Int of the signal decreases corresponds to the period in which the tip portion of the inspection object 80 passes through the inspection position Ps. Hereinbelow, the period in which the intensity Int of the signal decreases is focused upon.

As shown in FIG. 3A, the period in which the intensity Int of the signal decreases is long when the mesh-shaped inner member 25b is not provided. The decay time is long. This state corresponds to a state in which the reflected wave is superimposed with the direct wave.

Conversely, when the length LL of the mesh-shaped inner member 25b is 30 mm or 50 mm as shown in FIGS. 3C and 3D, the period in which the intensity Int of the signal decreases is short. The decay time is short. This state corresponds to a state in which the reflected wave has greatly attenuated and is substantially not superimposed with the direct wave. In such cases, the inspection object 80 can be appropriately inspected. For example, the direct wave has a signal intensity that reflects the transmittance of the inspection object 80. Compared to the reflected wave, the direct wave reflects the state of the inspection object 80 with higher accuracy. For example, the inspection object 80 can be appropriately inspected by the direct wave substantially not being superimposed with the reflected wave. For example, the reflections are greatly attenuated in the measurement of the end portion of the inspection object 80. The inspection object 80 can be more appropriately inspected thereby.

When the length LL of the inner member 25b is 10 mm as shown in FIG. 3B, the period in which the intensity Int of the signal decreases is shorter than that of FIG. 3A, but the magnitude of the reduction is small.

The transmittance (a receiving-side transmittance Q2) of the receiving-side waveguide 25 for the first ultrasonic wave 10w changes according to the length LL of the inner member 25b. When the length LL is 0, the receiving-side transmittance Q2 is 63%. When the length LL is 10 mm, the receiving-side transmittance Q2 is 60%. When the length LL is 30 mm, the receiving-side transmittance Q2 is 52%. When the length LL is 50 mm, the receiving-side transmittance Q2 is 46%. For example, the receiving-side transmittance Q2 corresponds to the ultrasonic wave intensity retention rate.

Thus, by setting the transmittance (the receiving-side transmittance Q2) of the receiving-side waveguide 25 to be low, the effects of reflected waves can be suppressed, and the inspection object 80 can be appropriately inspected.

When the transmittance of the waveguide is low, the intensity of the ultrasonic wave that is received by the receiver 20 becomes low. Therefore, generally, it is considered to be favorable for the transmittance of the receiving-side waveguide 25 to be high. However, when inspecting the inspection object 80 at high speed, a state occurs in which the reflected wave is superimposed with the next burst wave. In such a state, an appropriate inspection is difficult using the general technical idea of increasing the transmittance of the waveguide.

According to the embodiment, a technical idea that is opposite to the general technical idea is employed. By reducing the transmittance (the receiving-side transmittance Q2) of the receiving-side waveguide 25, the effects of reflected waves can be suppressed, and the inspection object 80 can be appropriately inspected. Even at a high inspection speed, the inspection object 80 can be inspected with high sensitivity. According to the embodiment, an inspection device can be provided in which the detection sensitivity can be increased.

Figure 4:
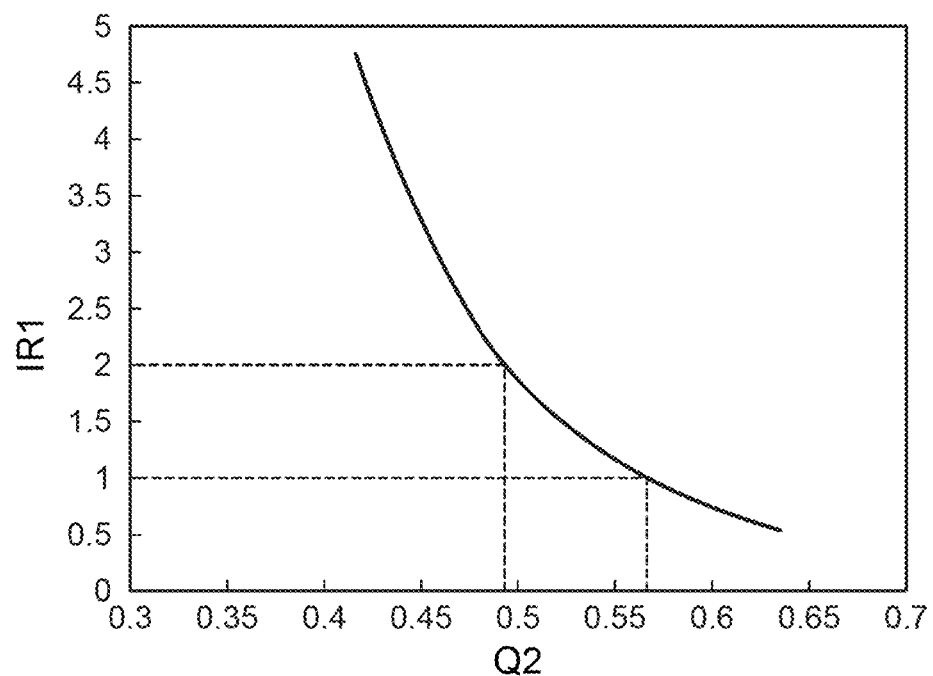
FIG. 4 is a graph illustrating a characteristic of the inspection device.

FIG. 4 is a graph illustrating a characteristic of the inspection device.

The horizontal axis of FIG. 4 is the transmittance (the receiving-side transmittance Q2) of the receiving-side waveguide 25 for the first ultrasonic wave 10w. The vertical axis is an intensity ratio IR1 of the signal received by the receiver 20. The intensity ratio IR1 is the ratio of the intensity of the direct wave to the intensity of the reflected wave.

As the receiving-side transmittance Q2 decreases as shown in the drawing, the intensity ratio IR1 increases, and the intensity of the direct wave increases.

For example, there are cases where foreign matter such as a resin tape is adhered to the paper that is the inspection object 80. In such a case, the signal intensity of the direct wave is reduced. The transmittance of the paper is about 5%; and the transmittance at a location where the tape is adhered is about ½ of the transmittance at a location where the tape is not adhered. If such a transmittance difference can be detected, the abnormality of the paper that is the inspection object 80 can be detected.

On the other hand, a reflected wave component that has a high intensity exists as a residual component at the end portion of the paper that is the inspection object 80. The reflected wave component becomes noise for the direct wave described above. For example, when the direct wave and the reflected wave are superimposed, the transmittance difference of the direct wave can be appropriately determined if a transmittance change that is not less than 20% exists. For example, the determination can be more stable if a transmittance change of 30% exists.

It was found by experiment that when the intensity of the reflected wave (the noise) is not more than the intensity of the direct wave, a signal change of about 20% is observed when the reflected wave and the direct wave are superimposed. In such a case, the tape (the foreign matter) that is adhered to the end portion of the paper that is the inspection object 80 can be detected.

When the intensity of the reflected wave is not more than ½ of the intensity of the direct wave, a signal change of about 35% is observed when the reflected wave and the direct wave are superimposed. In such a case, a sufficient transmittance difference at the foreign matter position is obtained.

As shown in FIG. 4, the intensity ratio IR1 is not less than 1 when the receiving-side transmittance Q2 is not more than 0.55. The intensity ratio IR1 is not less than 2 when the receiving-side transmittance Q2 is not more than 0.5.

According to the embodiment, it is favorable for the receiving-side transmittance Q2 to be less than 0.55. It is favorable for the receiving-side transmittance Q2 to be less than 0.50. The effects of reflected waves can be effectively suppressed by setting the receiving-side transmittance Q2 to be low.

It is favorable for the receiving-side transmittance Q2 to be, for example, not less than 0.1. When the receiving-side transmittance Q2 is excessively low, the effects of the noises in the reception by the receiver 20 increase. The effects of the noise can be suppressed by setting the receiving-side transmittance Q2 to be not less than 0.1. Detection with higher sensitivity is possible.

FIGS. 5A to 5D and FIGS. 6A to 6D are schematic views illustrating characteristics of the inspection device.

FIGS. 5A to 5D correspond to when the receiving-side transmittance Q2 is high. FIGS. 6A to 6D correspond to when the receiving-side transmittance Q2 is low.

Figures 5A, 5B, 5C, 5D:
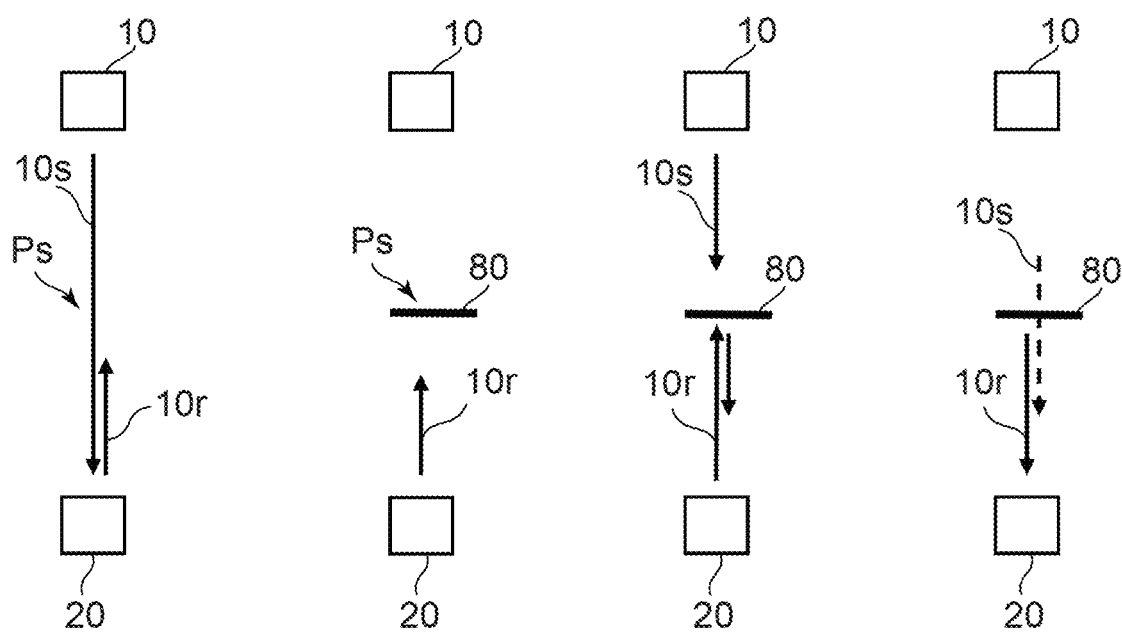
FIGS. 5A to 5D are schematic views illustrating characteristics of the inspection device.

FIG. 5A corresponds to the initial state. In the initial state, the inspection object 80 is not at the inspection position Ps. An ultrasonic wave signal 10s that is emitted from the transmitter 10 is received by the receiver 20. A portion of the ultrasonic wave signal 10s is reflected by the receiver 20 and becomes a reflected wave 10r.

As shown in FIG. 5B, the inspection object 80 is at the inspection position Ps. In FIG. 5B, the reflected wave 10r does not reach the inspection position Ps.

As shown in FIG. 5C, the reflected wave 10r reaches the inspection position Ps after the state of FIG. 5B. The reflected wave 10r is reflected by the inspection object 80 and travels toward the receiver 20. On the other hand, the ultrasonic wave signal 10s of the next burst wave is emitted from the transmitter 10.

As shown in FIG. 5D, the ultrasonic wave signal 10s of the next burst wave passes through the reflected wave 10r and the inspection object 80 and reaches the receiver 20 after the state of FIG. 5C. At this time, the reflected wave 10r and the ultrasonic wave signal 10s of the next burst wave are temporally superimposed. When the receiving-side transmittance Q2 is high, the intensity of the reflected wave 10r is high. Therefore, the effects of the reflected wave 10r increase, and an appropriate inspection is difficult.

Figure 6A:
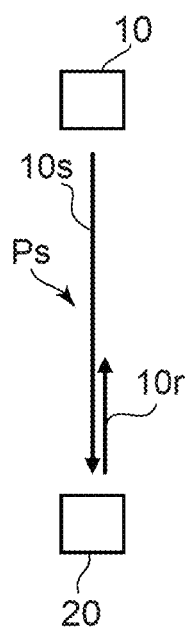
FIGS. 6A to 6D are schematic views illustrating characteristics of the inspection device.

FIG. 6A corresponds to the initial state. In such a case as well, a portion of the ultrasonic wave signal 10s is reflected by the receiver 20 and becomes the reflected wave 10r.

Figure 6B:
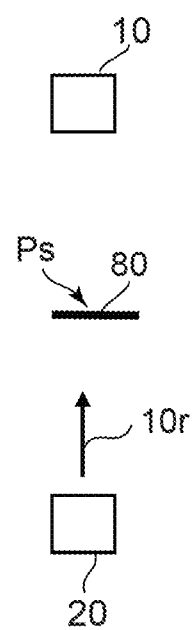

As shown in FIG. 6B, the inspection object 80 is at the inspection position Ps. In FIG. 6B, the reflected wave 10r has not reached the inspection position Ps.

Figure 6C:
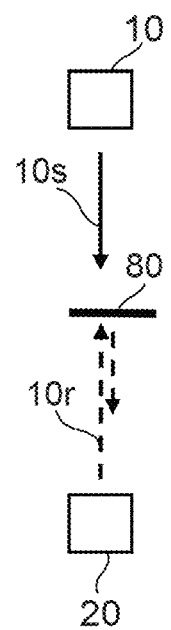

As shown in FIG. 6C, the reflected wave 10r reaches the inspection position Ps after the state of FIG. 6B. The reflected wave 10r is reflected by the inspection object 80 and travels toward the receiver 20. Because the receiving-side transmittance Q2 is low, the reflected wave 10r attenuates. Because the reflected wave 10r travels round trip between the receiver 20 and the inspection position Ps, the amount of the attenuation of the reflected wave 10r is large. On the other hand, the ultrasonic wave signal 10s of the next burst wave is emitted from the transmitter 10.

Figure 6D:
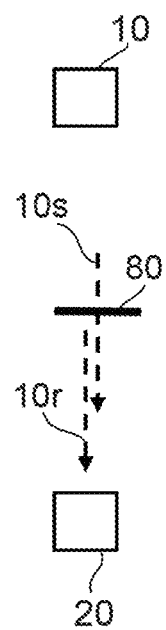

As shown in FIG. 6D, the ultrasonic wave signal 10s of the next direct wave passes through the reflected wave 10r and the inspection object 80 and reaches the receiver 20 after the state of FIG. 6C. At this time, the reflected wave 10r and the ultrasonic wave signal 10s of the next direct wave are temporally superimposed. Because the receiving-side transmittance Q2 is low, the intensity of the reflected wave 10r is low. Therefore, the effects of the reflected wave 10r are suppressed. An appropriate inspection can be performed thereby.

An example will now be described in which the reflected wave that is incident on the receiver 20 is superimposed with the next one of the multiple direct waves.

As shown in FIG. 1, the distance along the first direction D1 (the direction from the transmitter 10 toward the receiver 20) between the inspection position Ps and the transmitter 10 is taken as a transmitting-side distance L1. The distance along the first direction D1 between the inspection position Ps and the receiver 20 is taken as a receiving-side distance L2. The propagation velocity of the first ultrasonic wave 10w in the space SP between the transmitter 10 and the receiver 20 is taken as a velocity vx.

Figure 7A:
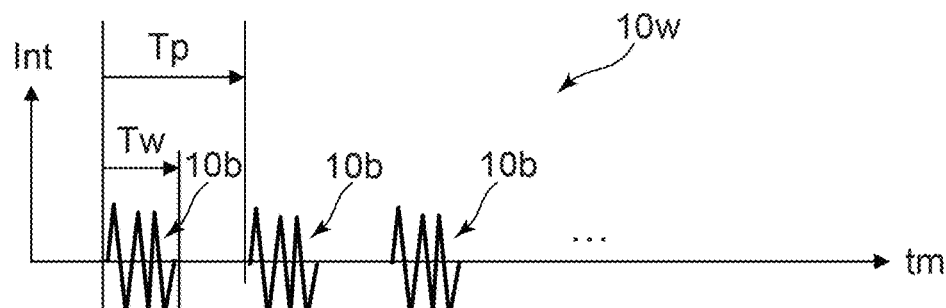
FIGS. 7A to 7C are schematic views illustrating characteristics of the inspection device.
Figure 7B:
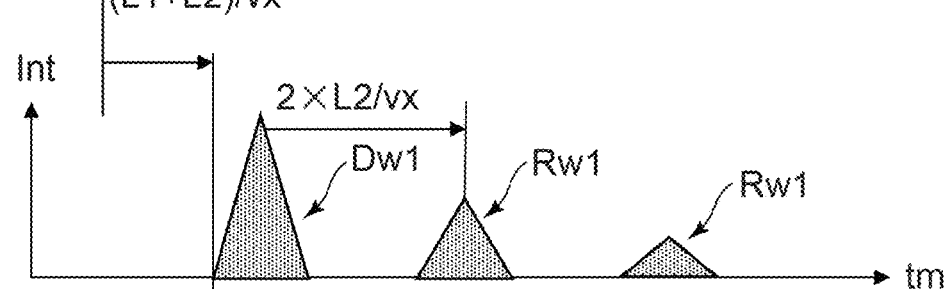
Figure 7C:
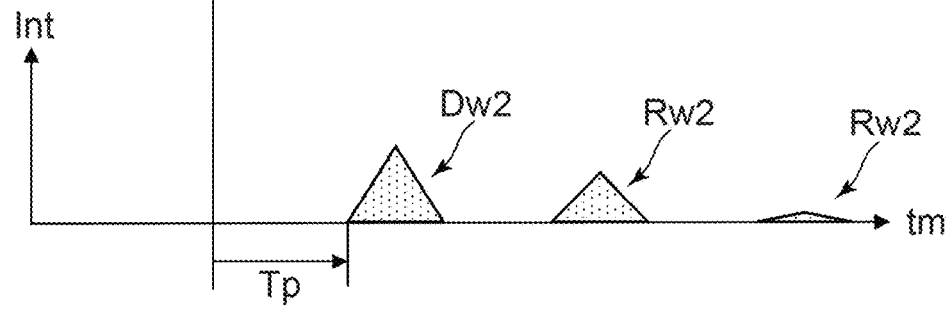

FIGS. 7A to 7C are schematic views illustrating characteristics of the inspection device.

FIG. 7A corresponds to the signal of the first ultrasonic wave 10w that is input to the transmitter 10. FIGS. 7B and 7C correspond to the received signal that is observed by the receiver 20. FIG. 7B corresponds to a received signal based on one of the multiple burst waves included in the first ultrasonic wave 10w. FIG. 7C corresponds to a received signal based on the next one of the multiple direct waves included in the first ultrasonic wave 10w. In these figures, the horizontal axis is the time tm. In these figures, the vertical axis is the intensity Int of the signal.

As shown in FIG. 7A, the first ultrasonic wave 10w includes multiple burst waves 10b. The period of the multiple burst waves 10b is the first period Tp. The time of one of the multiple burst waves 10b is a time Tw.

As shown in FIG. 7B, the ultrasonic wave signal that is emitted by the electrical signal of one burst wave 10b is received by the receiver 20. The signal that is received by the receiver 20 includes a direct wave Dw1 and multiple reflected waves Rw1. The time between the direct wave Dw1 and the time of the one burst wave 10b is (L1+L2)/vx. The time between the direct wave Dw1 and the initial reflected wave Rw1 is 2×L2/vx.

As shown in FIG. 7C, the ultrasonic wave that is emitted by the next burst wave 10b is received by the receiver 20. The signal that is received by the receiver 20 includes a direct wave Dw2 and multiple reflected waves Rw2. These signals are in a state in which the inspection object 80 is inserted. The intensities of these signals are attenuated by the inspection object 80. The intensities of these signals are low compared to the signals of FIG. 7B.

The reflected wave Rw1 becomes superimposed with the direct wave Dw2 if the direct wave Dw2 reaches the receiver 20 before the initial reflected wave Rw1 reaches the receiver 20.

When the reflected wave Rw1 is superimposed with the direct wave Dw2, the first period Tp (s), the receiving-side distance L2 ($m$), and the velocity vx (m/s) satisfy the first formula.

$$Tp < 2 \times L2/vx \qquad (1)$$

When such a first formula is satisfied, it is difficult to appropriately inspect the inspection object 80 due to the effects of reflected waves if the receiving-side transmittance Q2 of the receiving-side waveguide 25 is high.

On the other hand, a high-speed inspection can be performed by satisfying the first formula recited above. When the first formula is satisfied, even for a high-speed inspection, the effects of reflected waves can be suppressed by reducing the receiving-side transmittance Q2; and an appropriate inspection can be performed.

According to the embodiment, for example, high detection sensitivity is obtained at the movement-direction tip portion of the inspection object 80.

When the inner member 25b has a surface unevenness configuration, it is favorable for the arithmetic average surface roughness Ra of the surface unevenness to be, for example, not less than 0.01 times and not more than 0.2 times the wavelength of the multiple burst waves. By setting the arithmetic average surface roughness Ra to be not more than 0.05 times the wavelength of the multiple burst waves, for example, the receiving-side transmittance Q2 can be effectively reduced.

Figure 8A:
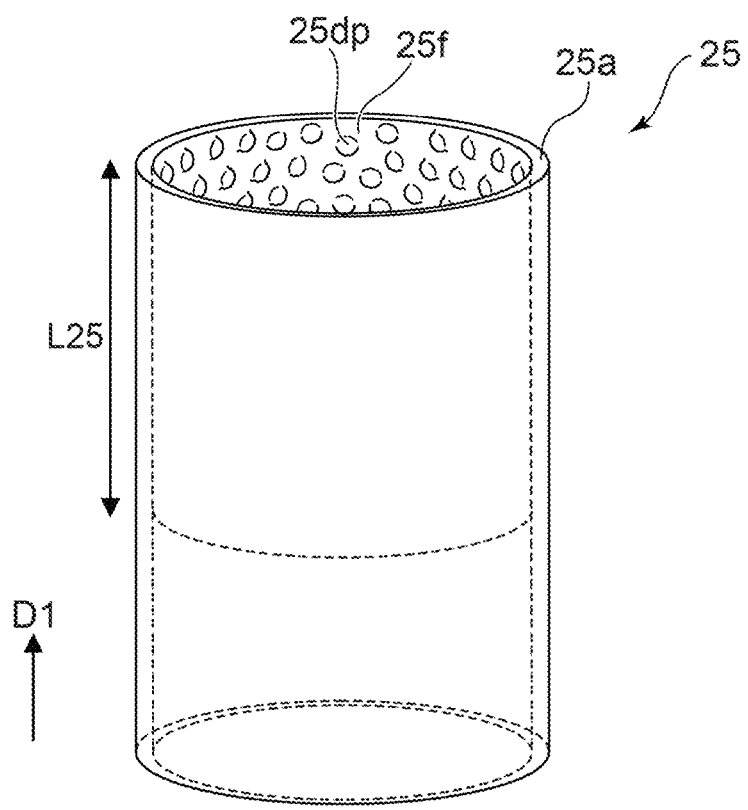
FIGS. 8A and 8B are schematic views illustrating a portion of the inspection device according to the first embodiment.
Figure 8B:
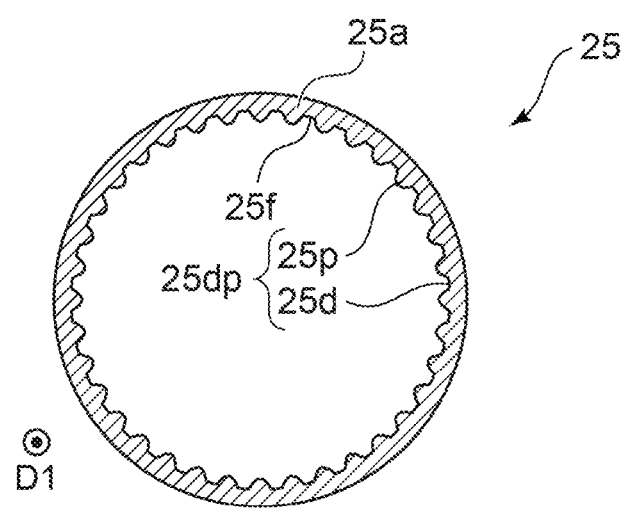

FIGS. 8A and 8B are schematic views illustrating a portion of the inspection device according to the first embodiment.

These drawings illustrate the receiving-side waveguide 25. FIG. 8A is a perspective view. FIG. 8B is a cross-sectional view. These drawings illustrate the second structure that relates to the receiving-side waveguide 25.

In the second structure as shown in FIGS. 8A and 8B, the receiving-side waveguide 25 includes the tubular member 25a. At least a portion of the tubular member 25a includes at least one of a mesh structure, a porous structure, or a surface unevenness structure. In the example, an inner surface 25f of the tubular member 25a includes an unevenness 25dp. The unevenness 25dp includes at least one of a recess 25d or a protrusion 25p. For example, the unevenness 25dp can be formed by various methods such as cutting, sandblasting, etc. The first ultrasonic wave 10w is attenuated by the unevenness 25dp when the first ultrasonic wave 10w passes through the receiving-side waveguide 25.

According to the embodiment as described above, the receiving-side waveguide 25 may include at least one of the first structure or the second structure. In the first structure, the receiving-side waveguide 25 includes the inner member 25b. In the second structure, the receiving-side waveguide 25 includes the tubular member 25a; and the inner surface 25f of the tubular member 25a includes the unevenness 25dp. The effects of reflected waves can be suppressed by such a receiving-side waveguide 25. An inspection device can be provided in which the detection sensitivity can be increased.

According to the embodiment, it is favorable for the arithmetic average surface roughness Ra of the unevenness 25dp to be, for example, not less than 0.01 times and not more than 0.2 times the wavelength of the multiple burst waves. By setting the arithmetic average surface roughness Ra to be not more than 0.05 times the wavelength of the multiple burst waves, for example, the receiving-side transmittance Q2 can be effectively reduced.

It is favorable for the mesh pitch of the inner member 25b to be not less than 0.005 times and not more than 0.2 times the wavelength of the multiple burst waves. By setting the mesh pitch to be not less than 0.01 times the wavelength of the multiple burst waves, for example, the amount of the attenuation of the ultrasonic wave per unit length can be increased.

As described above, the inspection device 110 may include the transmitting-side waveguide 15. The transmitting-side waveguide 15 is located between the transmitter 10 and the inspection position Ps. The first ultrasonic wave 10w passes through the transmitting-side waveguide 15. In one example, the receiving-side transmittance Q2 of the receiving-side waveguide 25 for the first ultrasonic wave 10w is less than a transmitting-side transmittance Q1 of the transmitting-side waveguide 15 for the first ultrasonic wave 10w. By setting the transmitting-side transmittance Q1 of the transmitting-side waveguide 15 for the first ultrasonic wave 10w to be high, the attenuation of the direct wave can be suppressed. Higher sensitivity is easily obtained.

When the transmitting-side waveguide 15 is provided, the transmitting-side transmittance Q1 corresponds to the ratio of the intensity of the first ultrasonic wave 10w emitted from the transmitting-side waveguide 15 to the intensity of the first ultrasonic wave 10w before being incident on the transmitting-side waveguide 15. When the receiving-side waveguide 25 is provided, the receiving-side transmittance Q2 corresponds to the ratio of the intensity of the first ultrasonic wave 10w emitted from the receiving-side waveguide 25 to the intensity of the first ultrasonic wave 10w before being incident on the receiving-side waveguide 25.

The transmittance of the detection object for the first ultrasonic wave 10w is taken as an inspection object transmittance Q3. In such a case, an intensity SG1 of the direct wave detected by the receiver 20 is represented by a second formula.

$$SG1 = Q1 \times Q3 \times Q2 \quad (2)$$

On the other hand, an intensity SR1 of the reflected wave detected by the receiver 20 is represented by a third formula.

$$SR1 = Q1 \times Q2 \times (Q2)^{2n} \quad (3)$$

In the third formula, "n" is an integer that is not less than 1 and corresponds to the number of round trips of the reflected wave.

High sensitivity is obtained when the intensity SG1 is greater than the intensity SR1. The inspection object transmittance Q3 is, for example, not more than 0.1. A high S/N ratio is easily obtained when the receiving-side transmittance Q2 is low.

Figure 9:
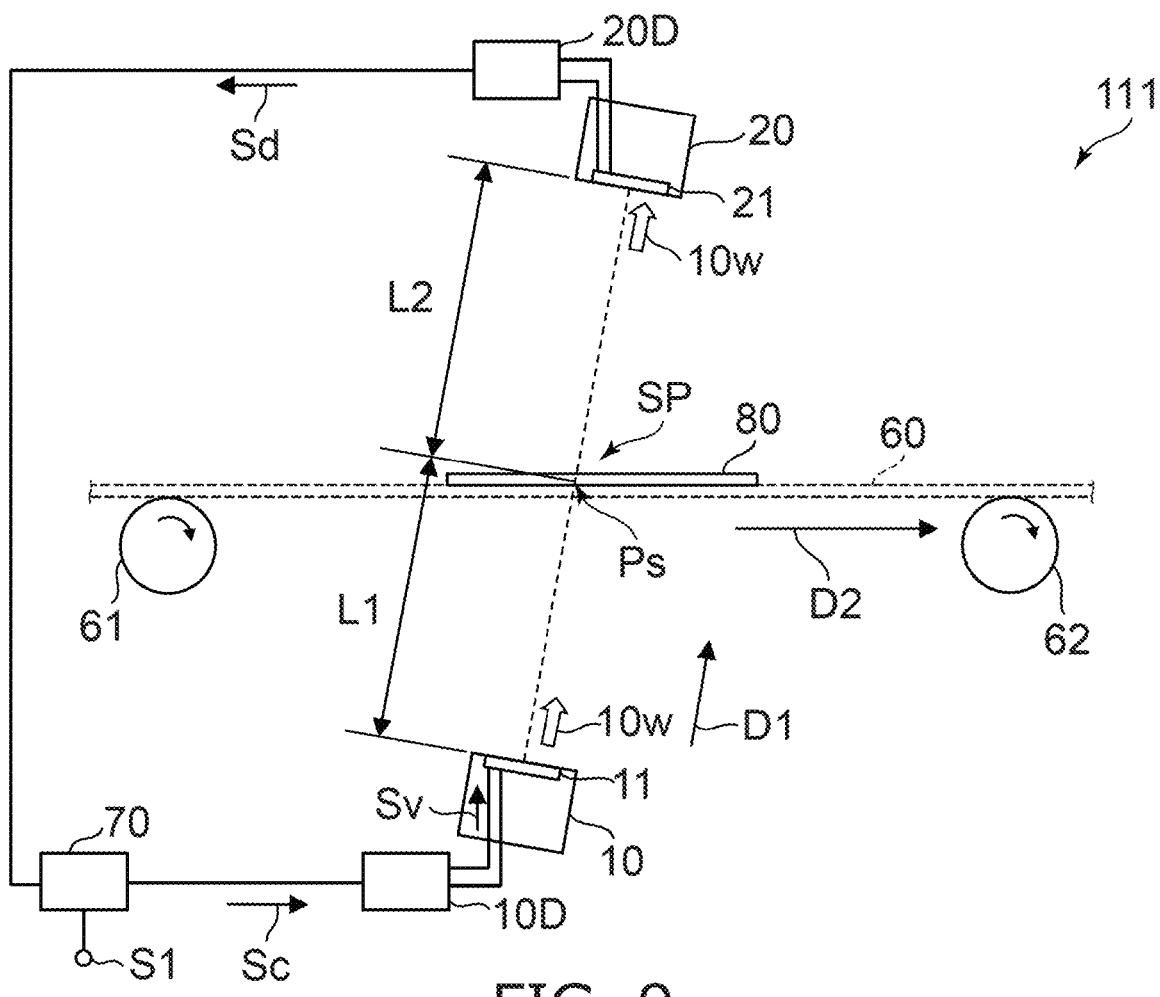
FIG. 9 is a schematic side view illustrating an inspection device according to the first embodiment.

FIG. 9 is a schematic side view illustrating an inspection device according to the first embodiment.

As shown in FIG. 9, the inspection device 111 according to the embodiment includes the transmitter 10 and the receiver 20. The receiving-side waveguide 25 may be omitted from the inspection device 111. The transmitting-side waveguide 15 may be omitted from the inspection device 111. In the inspection device 111, the transmittance at the receiving side may be reduced by a method other than the receiving-side waveguide 25.

In such a case, the receiving-side transmittance Q2 for the first ultrasonic wave 10w between the inspection position Ps and the receiver 20 is less than 0.55. In the inspection device 111, the first formula recited above is satisfied. A high-speed inspection is possible thereby.

Figure 10:
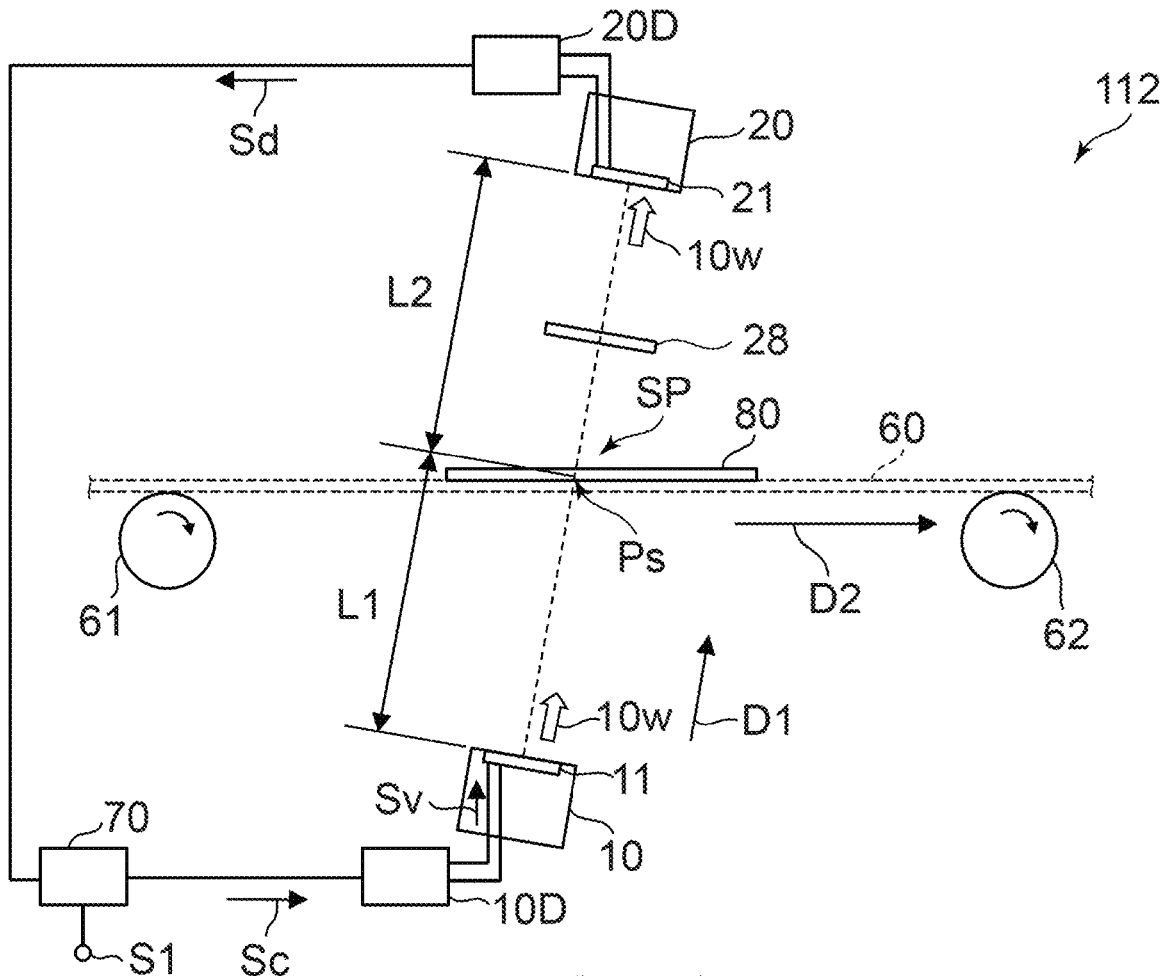
FIG. 10 is a schematic side view illustrating an inspection device according to the first embodiment.

FIG. 10 is a schematic side view illustrating an inspection device according to the first embodiment.

As shown in FIG. 10, the inspection device 112 according to the embodiment includes an attenuating member 28 in addition to the transmitter 10 and the receiver 20. The attenuating member 28 is located between the inspection position Ps and the receiver 20. In the inspection device 112, various configurations may be employed as the receiving-side waveguide 25. The receiving-side transmittance Q2 of the receiving-side waveguide 25 for the first ultrasonic wave 10w is, for example, less than 0.55. In the inspection device 112, the first formula recited above is satisfied. A high-speed inspection is possible thereby.

For example, a member that includes a surface unevenness is used as the attenuating member 28. For example, multiple protrusions and multiple recesses are provided in the surface of the member. The multiple protrusions protrude relative to the multiple recesses. For example, the surface area of the multiple protrusions is set to be substantially equal to the surface area of the multiple recesses. For example, the height difference between the multiple protrusions and the multiple recesses is set to be substantially ¼ of the wavelength of the ultrasonic wave. The ultrasonic wave (the reflected wave) can be attenuated by such an attenuating member 28. For example, the multiple protrusions and the multiple recesses are alternately located along two directions.

Second Embodiment

A second embodiment relates to an inspection method.

Figure 11:
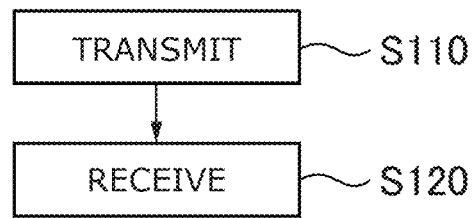
FIG. 11 is a flowchart illustrating an inspection method according to a second embodiment.

FIG. 11 is a flowchart illustrating the inspection method according to the second embodiment.

In the inspection method according to the embodiment as shown in FIG. 11, the first ultrasonic wave 10w that includes the multiple burst waves 10b having the first period Tp is transmitted from the transmitter 10 toward the inspection object 80 (step S110). In the inspection method, the inspection object 80 is inspected by the receiver 20 receiving the first ultrasonic wave 10w that passes through the inspection object 80 (step S120).

For example, as shown in FIG. 1, the first period Tp (s), the receiving-side distance L2 (m), and the velocity vx (m/s) can be defined. In the inspection method, $Tp < 2 \times L2/vx$ is satisfied.

The receiving-side distance L2 is the distance between the inspection position Ps and the receiver 20 along the first direction D1 that is from the transmitter 10 toward the receiver 20. The inspection object 80 passes through the inspection position Ps along the second direction D2 that crosses the first direction D1. The velocity vx is the propagation velocity of the first ultrasonic wave 10w in the space SP between the transmitter 10 and the receiver 20. In the inspection method according to the embodiment, the receiving-side transmittance Q2 for the first ultrasonic wave 10w between the inspection position Ps and the receiver 20 is less than 0.55. In the inspection method according to the embodiment, the effects of reflected waves are suppressed. For example, high detection sensitivity is obtained at the movement-direction tip portion of the inspection object 80.

In the inspection method according to the embodiment, it is favorable for the receiving-side transmittance Q2 to be less than the transmitting-side transmittance Q1 for the first ultrasonic wave 10w between the inspection position Ps and the transmitter 10. For example, the attenuation of the direct wave can be suppressed thereby. High sensitivity is easily obtained thereby.

Figure 12A:
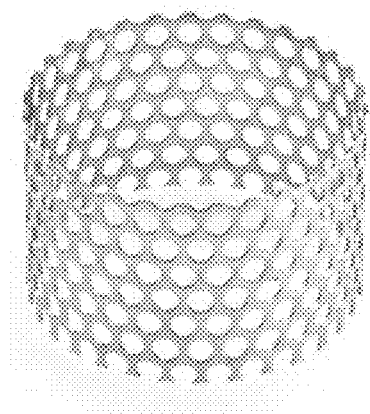
FIGS. 12A to 12C are schematic views illustrating portions of the inspection device according to the embodiment.
Figure 12B:
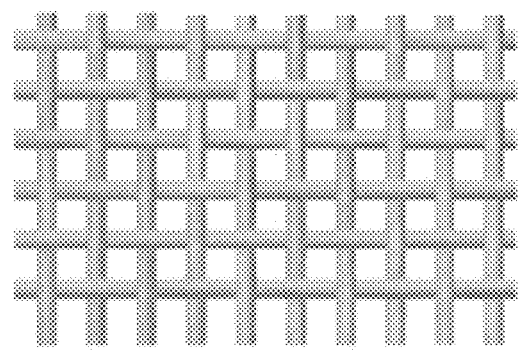
Figure 12C:
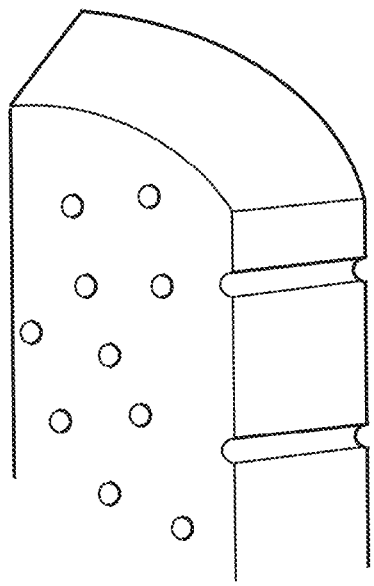

FIGS. 12A to 12C are schematic views illustrating portions of the inspection device according to the embodiment.

These drawings illustrate mesh structures of at least one of the tubular member 25a or the inner member 25b. In the example of FIG. 12A, the mesh structure includes multiple pores. In the example of FIG. 12B, the mesh structure is a woven mesh structure. In the example of FIG. 12C, at least a portion of the pores of the mesh structure extend through the member in the thickness direction of the member.

Figure 13A:
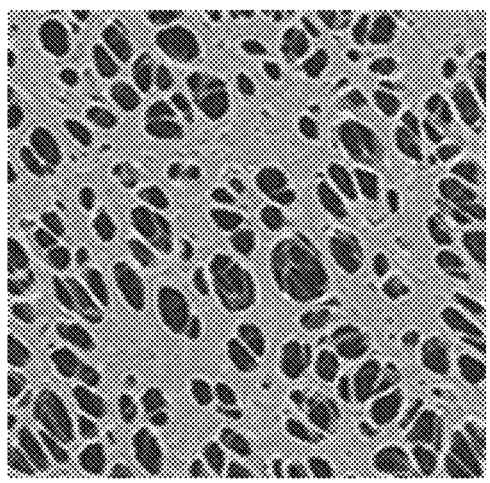
FIGS. 13A and 13B are schematic views illustrating portions of the inspection device according to the embodiment.
Figure 13B:
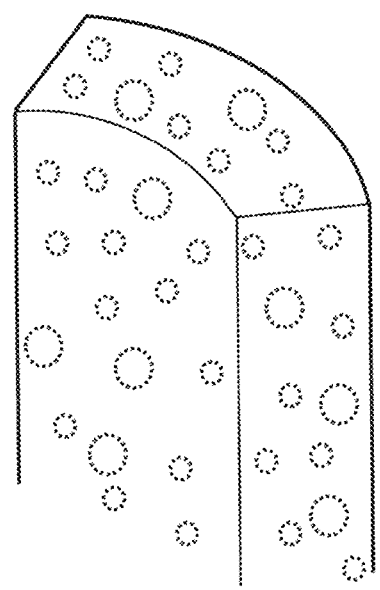

FIGS. 13A and 13B are schematic views illustrating portions of the inspection device according to the embodiment.

These drawings illustrate porous structures of at least one of the tubular member 25a or the inner member 25b. In the example of FIG. 13A, irregular multiple pores are provided. One of the multiple pores may be continuous with another one of the multiple pores. In the example of FIG. 13B, at least one of the multiple pores may be separated from another one of the multiple pores.

For example, the surface unevenness structure of at least one of the tubular member 25a or the inner member 25b may have the structure illustrated in FIG. 8B. In the surface unevenness structure, for example, one protrusion 25p and multiple recesses 25d may be provided. For example, one recess 25d and multiple protrusions 25p may be provided. For example, one protrusion 25p and one recess 25d may be provided. In the surface unevenness structure, the unevenness 25dp may be located at the inner surface and the outer surface. The shapes of the protrusion 25p and the recess 25d of the surface unevenness structure are arbitrary.

Embodiments may include the following configurations (e.g., technological proposals).

Configuration 1

An inspection device, comprising:
a transmitter configured to transmit a first ultrasonic wave;
a receiver on which the first ultrasonic wave is incident, the receiver being configured to output a signal corresponding to the incident first ultrasonic wave; and
a receiving-side waveguide located between the receiver and an inspection position,
the inspection position being between the transmitter and the receiver,
the first ultrasonic wave passing through the receiving-side waveguide,
an inspection object passing through the inspection position along a second direction crossing a first direction, the first direction being from the transmitter toward the receiver,
the receiving-side waveguide including at least one of a first structure or a second structure,
in the first structure:
the receiving-side waveguide includes a tubular member and an inner member;
the inner member is located inside the tubular member; and
at least a portion of the inner member includes at least one of a mesh structure, a porous structure, or a surface unevenness structure,
in the second structure:
the receiving-side waveguide includes a tubular member; and
at least a portion of the tubular member includes at least one of a mesh structure, a porous structure, or a surface unevenness structure.

Configuration 2

The inspection device according to Configuration 1, wherein
the first ultrasonic wave includes a plurality of burst waves.

Configuration 3

The inspection device according to Configuration 2, wherein
the inner member or the tubular member includes the surface unevenness structure, and
an arithmetic average surface roughness Ra of an unevenness of the surface unevenness structure is not less than 0.01 times and not more than 0.2 times a wavelength of the plurality of burst waves.

Configuration 4

The inspection device according to Configuration 2, wherein
the inner member has a mesh configuration, and
a mesh pitch of the inner member is not less than 0.005 times and not more than 0.2 times a wavelength of the plurality of burst waves.

Configuration 5

The inspection device according to any one of Configurations 1 to 4, wherein
the first ultrasonic wave that passes through the receiving-side waveguide is incident on the receiver,
the first ultrasonic wave that is reflected by the receiver is reflected by the inspection object, and
the first ultrasonic wave that is reflected by the inspection object passes through the receiving-side waveguide and is incident on the receiver.

Configuration 6

The inspection device according to any one of Configurations 1 to 5, further comprising:
a transmitting-side waveguide located between the transmitter and the inspection position,
the first ultrasonic wave passing through the transmitting-side waveguide.

Configuration 7

The inspection device according to Configuration 6, wherein
a receiving-side transmittance of the receiving-side waveguide for the first ultrasonic wave is less than a transmitting-side transmittance of the transmitting-side waveguide for the first ultrasonic wave.

Configuration 8

The inspection device according to any one of Configurations 1 to 7, wherein
a transmittance of the receiving-side waveguide for the first ultrasonic wave is less than 0.55.

Configuration 9

An inspection device, comprising:
a transmitter configured to transmit a first ultrasonic wave, the first ultrasonic wave including a plurality of burst waves having a first period Tp; and
a receiver on which the first ultrasonic wave is incident, the receiver being configured to output a signal corresponding to the incident first ultrasonic wave,
the first period Tp (s), a receiving-side distance L2 (m), and a velocity vx (m/s) satisfying $$Tp < 2 \times L2/vx,$$

the receiving-side distance being a distance along a first direction between the receiver and an inspection position,
the first direction being from the transmitter toward the receiver,
an inspection object passing through the inspection position along a second direction crossing the first direction,
the velocity vx being a propagation velocity of the first ultrasonic wave in a space between the transmitter and the receiver,
a receiving-side transmittance for the first ultrasonic wave between the inspection position and the receiver being less than 0.55.

Configuration 10

The inspection device according to Configuration 9, wherein
the receiving-side transmittance is less than a transmitting-side transmittance for the first ultrasonic wave between the inspection position and the transmitter.

Configuration 11

The inspection device according to Configuration 9 or 10, wherein
the receiver includes a receiving-side membrane portion,
the receiving-side membrane portion is deformable by the received first ultrasonic wave, and
the receiving-side distance is a distance along the first direction between the inspection position and the receiving-side membrane portion.

Configuration 12

The inspection device according to any one of Configurations 9 to 11, further comprising:
a receiving-side waveguide,
the receiving-side waveguide being located between the inspection position and the receiver,
the first ultrasonic wave passing through the receiving-side waveguide and being incident on the receiver.

Configuration 13

The inspection device according to Configuration 12, wherein
a transmittance of the receiving-side waveguide for the first ultrasonic wave is less than 0.55.

Configuration 14

The inspection device according to Configuration 12 or 13, wherein
the first ultrasonic wave that passes through the receiving-side waveguide is incident on the receiver,
the first ultrasonic wave that is reflected by the receiver is reflected by the inspection object, and
the first ultrasonic wave that is reflected by the inspection object passes through the receiving-side waveguide and is incident on the receiver.

Configuration 15

The inspection device according to any one of Configurations 12 to 14, further comprising:
a transmitting-side waveguide located between the transmitter and the inspection position,
the first ultrasonic wave passing through the transmitting-side waveguide.

Configuration 16

The inspection device according to Configuration 15, wherein
a receiving-side transmittance of the receiving-side waveguide for the first ultrasonic wave is less than a transmitting-side transmittance of the transmitting-side waveguide for the first ultrasonic wave.

Configuration 17

The inspection device according to any one of Configurations 1 to 16, further comprising:
a supporter,
the supporter being configured to support the inspection object and to cause the inspection object to pass through the inspection position.

Configuration 18

The inspection device according to Configuration 17, wherein
the supporter supports the inspection object at a position at which the first ultrasonic wave is not irradiated on the supporter.

Configuration 19

An inspection method, comprising:
transmitting, from a transmitter toward an inspection object, a first ultrasonic wave including a plurality of burst waves having a first period Tp; and
inspecting the inspection object by using a receiver to receive the first ultrasonic wave after the first ultrasonic wave passes through the inspection object,
the first period Tp (s), a receiving-side distance L2 (m), and a velocity vx (m/s) satisfying $$Tp < 2 \times L2/vx,$$

the receiving-side distance being a distance along a first direction between the inspection position and the receiver,
the first direction being from the transmitter toward the receiver,
the inspection object passing through the inspection position along a second direction crossing the first direction,
the velocity vx being a propagation velocity of the first ultrasonic wave in a space between the transmitter and the receiver,
a receiving-side transmittance for the first ultrasonic wave between the inspection position and the receiver being less than 0.55.

Configuration 20

The inspection method according to Configuration 19, wherein
the receiving-side transmittance is less than a transmitting-side transmittance for the first ultrasonic wave between the inspection position and the transmitter.

According to embodiments, an inspection device and an inspection method can be provided in which the detection sensitivity can be increased.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in inspection devices such as transmitters, receivers, supporters, transmitting circuits, receiving circuits, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all inspection devices, and inspection methods practicable by an appropriate design modification by one skilled in the art based on the inspection devices, and the inspection methods described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An inspection device, comprising:
   a transmitter configured to transmit a first ultrasonic wave;
   a receiver on which the first ultrasonic wave is incident, the receiver being configured to output a signal corresponding to the incident first ultrasonic wave; and
   a receiving-side waveguide located between the receiver and an inspection position,
   the inspection position being between the transmitter and the receiver,
   the first ultrasonic wave passing through the receiving-side waveguide,
   an inspection object passing through the inspection position along a second direction crossing a first direction,
   the first direction being from the transmitter toward the receiver,
   the receiving-side waveguide including at least one of a first structure or a second structure,
   in the first structure:
     the receiving-side waveguide includes a tubular member and an inner member;
     the inner member is located inside the tubular member; and
     at least a portion of the inner member includes at least one of a mesh structure, a porous structure, or a surface unevenness structure,
   in the second structure:
     the receiving-side waveguide includes a tubular member; and
     at least a portion of the tubular member includes at least one of a mesh structure, a porous structure, or a surface unevenness structure.

2. The device according to claim 1, wherein
   the first ultrasonic wave includes a plurality of burst waves.

3. The device according to claim 2, wherein
   the inner member or the tubular member includes the surface unevenness structure, and
   an arithmetic average surface roughness Ra of an unevenness of the surface unevenness structure is not less than 0.01 times and not more than 0.2 times a wavelength of the plurality of burst waves.

4. The device according to claim 2, wherein
   the inner member has a mesh configuration, and
   a mesh pitch of the inner member is not less than 0.005 times and not more than 0.2 times a wavelength of the plurality of burst waves.

5. The device according to claim 1, wherein
   the first ultrasonic wave that passes through the receiving-side waveguide is incident on the receiver,
   the first ultrasonic wave that is reflected by the receiver is reflected by the inspection object, and
   the first ultrasonic wave that is reflected by the inspection object passes through the receiving-side waveguide and is incident on the receiver.

6. The device according to claim 1, further comprising:
   a transmitting-side waveguide located between the transmitter and the inspection position,
   the first ultrasonic wave passing through the transmitting-side waveguide.

7. The device according to claim 6, wherein
   a receiving-side transmittance of the receiving-side waveguide for the first ultrasonic wave is less than a transmitting-side transmittance of the transmitting-side waveguide for the first ultrasonic wave.

8. The device according to claim 1, wherein
   a transmittance of the receiving-side waveguide for the first ultrasonic wave is less than 0.55.

* * * * *